United States Patent
Wu

(10) Patent No.: US 9,384,099 B2
(45) Date of Patent: Jul. 5, 2016

(54) VIRTUAL TAPE LIBRARY DEVICE AND DATA RECOVERY METHOD

(71) Applicant: HUAWEI TECHNOLOGIES CO., LTD., Shenzhen (CN)

(72) Inventor: Kaidi Wu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 340 days.

(21) Appl. No.: 14/143,752

(22) Filed: Dec. 30, 2013

(65) Prior Publication Data

US 2014/0136892 A1    May 15, 2014

Related U.S. Application Data

(63) Continuation of application No. PCT/CN2012/079612, filed on Aug. 3, 2012.

(30) Foreign Application Priority Data

Nov. 25, 2011    (CN) .......................... 2011 1 0380759

(51) Int. Cl.
*G06F 11/00* (2006.01)
*G06F 11/14* (2006.01)
(Continued)

(52) U.S. Cl.
CPC ............ *G06F 11/1464* (2013.01); *G06F 3/061* (2013.01); *G06F 3/0658* (2013.01);
(Continued)

(58) Field of Classification Search
CPC ............ G06F 11/1464; G06F 11/1456; G06F 11/1469; G06F 11/1448; H04L 67/1097
See application file for complete search history.

(56) References Cited

U.S. PATENT DOCUMENTS 8,055,870 B2 * 11/2011 Bitner ................... G06F 3/0604
709/219
2005/0033911 A1    2/2005 Kitamura et al.
(Continued)

FOREIGN PATENT DOCUMENTS

CN    101453489 A    6/2009
CN    101694635 A    4/2010
(Continued)

OTHER PUBLICATIONS

"Accelerating backup/restore with the virtual tape library configuration that fits your environment." Falconstor Software. 2006. Retrieved on Feb. 1, 2016.*
(Continued)

*Primary Examiner* — Philip Guyton
(74) *Attorney, Agent, or Firm* — Brinks Gilson & Lione

(57) ABSTRACT

The present invention provides a VTL device and a data recovery method. The method includes: receiving a data recovery instruction from a user equipment, and sending the data recovery instruction to a file drive unit; responding, by a file drive unit to the data recovery instruction, acquiring virtual tape configuration information corresponding to to-be-recovered backup data from a VTL configuration unit, wherein the virtual tape configuration information is generated by the VTL configuration unit during completion of data backup and comprises an offset position of a data block used for storing the backup data and a size of the data block in a virtual tape; reading, by an input/output management unit, recovery data from a storage medium according to the virtual tape configuration information, and sending the recovery data to the NAS interface unit; and returning, by the NAS interface unit, the recovery data to the user equipment.

8 Claims, 4 Drawing Sheets

(51) Int. Cl.
   *H04L 29/08* (2006.01)
   *G06F 3/06* (2006.01)
(52) U.S. Cl.
   CPC ............ *G06F3/0659* (2013.01); *G06F 3/0686* (2013.01); *G06F 11/1448* (2013.01); *G06F 11/1456* (2013.01); *H04L 67/1097* (2013.01); *G06F 11/1469* (2013.01); *G06F 2201/815* (2013.01)

(56) References Cited

U.S. PATENT DOCUMENTS

| | | | |
|---|---|---|---|
| 2008/0002694 A1 | 1/2008 | Brahmaroutu et al. | |
| 2009/0240877 A1* | 9/2009 | Taniyama | G06F 3/0605 711/111 |

FOREIGN PATENT DOCUMENTS

| | | |
|---|---|---|
| CN | 101739307 A | 6/2010 |
| CN | 101741809 A | 6/2010 |
| CN | 101751231 A | 6/2010 |
| CN | 102521072 A | 6/2012 |

OTHER PUBLICATIONS

MacLean et al. "Using Yosemite backup virtual tape libraries." Dell Power Solutions, May 2006. Retrieved on Feb. 1, 2016.*

Lowe, S., "FalconStor Introduces a NAS Interface" printed Jul. 3, 2014 from blog.scottlowe.org, Dec. 2, 2008, 2 pages.

* cited by examiner

VIRTUAL TAPE LIBRARY DEVICE AND DATA RECOVERY METHOD

CROSS-REFERENCE TO RELATED APPLICATIONS

This application is a continuation of International Application No. PCT/CN2012/079612, filed on Aug. 3, 2012, which claims priority to Chinese Patent Application No. 201110380759.3, filed on Nov. 25, 2011, both of which are hereby incorporated by reference in their entireties.

TECHNICAL FIELD

The present invention relates to data processing technologies and the field of wireless communications technologies, and in particular to a virtual tape library device and a data recovery method.

BACKGROUND

As informatization popularizes and structured and non-structured data explosively increase, more and more enterprises and people start to realize the importance of data protection and increase inputs and constructions. A data backup system that is formed by data backup software and a virtual tape library (Virtual Tape Liberary, VTL) device becomes a rather popular solution.

FIG. 1 is a data flow diagram of data backup performed based on data backup software and a VTL device according to the prior art. As shown in FIG. 1, the data backup software on a backup server packages data on client A and client B and backs up the packaged data to the VTL device through a VTL interface by using a virtual tape as a backup medium. FIG. 2 is a data flow diagram of data recovery performed based on data backup software and a VTL device according to the prior art. As shown in FIG. 2, when some data on a client is damaged or lost and data recovery needs to be performed, the data backup software on the data backup server recovers one or several virtual tapes in the VTL device to original client A and client B through the VTL interface according to a recovery policy, and then the data backup software unpacks a backup data packet in the virtual tape, so that client A and client B recover data to a state of a backup point.

When data recovery is performed by using the above method, no matter whether all data before a backup point is recovered or only a small amount of partial data or files is recovered, it needs to be implemented by using the data backup software manually, thereby increasing complexity of data recovery and reducing recovery efficiency; in addition, all recovery data flows need to pass through the backup server and occupy considerable resources of the backup server. If the backup server is performing a data backup task, it may increase the time for performing the data backup task and reduce the data recovery efficiency.

SUMMARY

To overcome the above defect, embodiments of the present invention provide a virtual tape library device and a data recovery method so as to implement data recovery with high efficiency.

According to one aspect of the present invention, a VTL device includes:

a VTL interface module, configured to receive a data backup instruction and backup data from a backup server and send the data backup instruction and the backup data to an input/output (I/O) management module through a VTL configuration module;

a network attached storage (NAS) interface module, configured to receive a data recovery instruction from a user equipment and send the data recovery instruction to a file drive module;

the VTL configuration module, configured to virtualize a storage medium to tapes, and after receiving the backup instruction, generate virtual tape configuration information corresponding to the backup data, where the virtual tape configuration information includes an offset position of a data block used for storing the backup data and a size of the data block in a virtual tape;

the file drive module, configured to acquire virtual tape configuration information corresponding to to-be-recovered backup data from the VTL configuration module after receiving the data recovery instruction; and the I/O management module, configured to, after receiving the backup instruction, acquire the virtual tape configuration information corresponding to the backup data from the VTL configuration module and write the backup data to the storage medium according to the virtual tape configuration information; and further configured to, when performing data recovery, read recovery data from the storage medium according to the virtual tape configuration information corresponding to the to-be-recovered backup data and send the recovery data to the NAS interface module; and the NAS interface module is further configured to return the recovery data to the user equipment.

According to another aspect of the present invention, a data recovery method implemented based on a VTL device further provided in the present invention includes:

receiving, by a NAS interface module, a data recovery instruction from a user equipment, and sending the data recovery instruction to a file drive module;

responding, by the file drive module, to the data recovery instruction, acquiring virtual tape configuration information corresponding to to-be-recovered backup data from the VTL configuration module, where the virtual tape configuration information is generated by the VTL configuration module during completion of data backup and includes an offset position of a data block used for storing the backup data and a size of the data block in a virtual tape;

reading, by an I/O management module, recovery data from the storage medium according to the virtual tape configuration information, and sending the recovery data to the NAS interface module; and returning, by the NAS interface module, the recovery data to the user equipment.

According to a VTL device and a data recovery method in the present invention, when the VTL device connects to a magnetic disk used for storing or the VTL device is integrated into a server, because the VTL device provides both a VTL interface module connecting to a backup server and a NAS interface module that is capable of implementing file sharing with a client, data backup may be performed by using the VTL interface module and a VTL configuration module; and when receiving a data recovery instruction through the NAS interface module, a file drive module may obtain an offset position of a data block used for storing data backed up in VTL mode and a size of the data block in a virtual tape by parsing from the VTL configuration module according to the data recovery instruction, so as to read data required to be recovered by the client and provide the data to the client through a NAS interface. Therefore, data recovery on data that has been backed up may be implemented by using a NAS interface based on the VTL device. When data recovery is performed in shared NAS mode, a user does not need to operate backup software and the recovered data does not need to pass through the backup server and may directly reach the client through the NAS interface. This improves efficiency and convenience of data recovery, relieves pressure of the backup server, and further provides the guarantee of efficiency and reliability of data recovery.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 3:
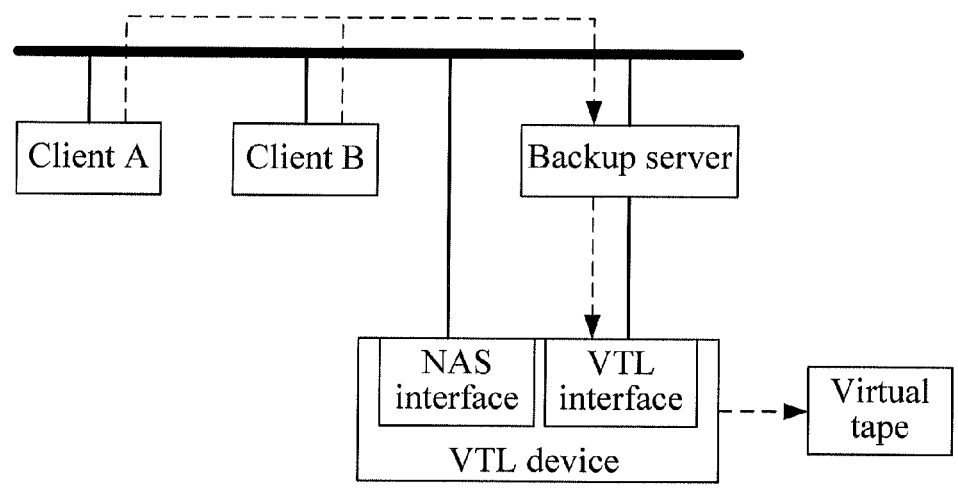
FIG. 3 is a schematic diagram of a data backup network structure applying to a VTL device according to an embodiment of the present invention.

FIG. 3 is a schematic diagram of a data backup network structure applying to a VTL device according to an embodiment of the present invention, where dashed lines indicate data flow directions in a data backup process. Specifically, as shown in FIG. 3, client A and client B (only two clients are used as an example for description herein) transfer data that needs to be backed up to a backup server, and the backup server transfers the data that needs to be backed up to a VTL interface of the VTL device through a fiber channel (Fiber Channel, FC) or an Internet protocol storage area network (Internet Protocol Storage Area Network, IP SAN). In addition, the VTL device further has a network attached storage (Network Attached Storage, NAS) interface and the VTL device share a network with client A and client B through the NAS interface.

Figure 1:
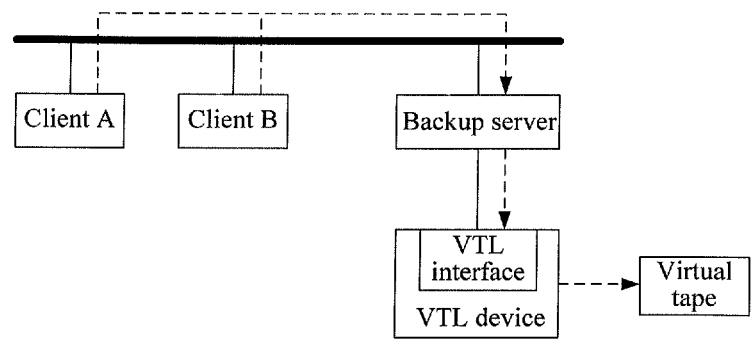
FIG. 1 is a data flow diagram of data backup performed based on data backup software and a VTL device according to the prior art.
Figure 2:
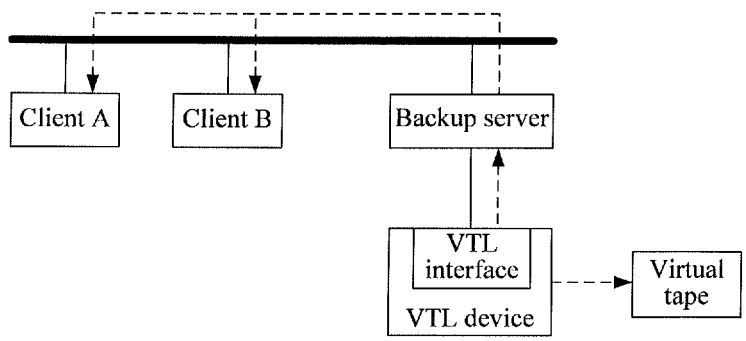
FIG. 2 is a data flow diagram of data recovery performed based on data backup software and a VTL device according to the prior art.
Figure 4:
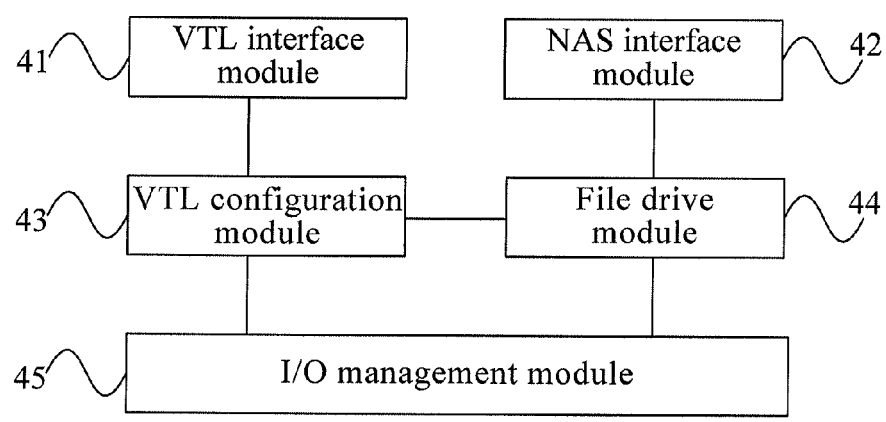
FIG. 4 is a schematic structural diagram of a VTL device according to an embodiment of the present invention.

FIG. 4 is a schematic structural diagram of a VTL device according to an embodiment of the present invention. As shown in FIG. 2, the VTL device according to this embodiment includes:

a VTL interface module 41, configured to receive a data backup instruction and backup data from a backup server and send the data backup instruction and the backup data to an I/O management module 45 through a VTL configuration module 43;

a NAS interface module 42, configured to receive a data recovery instruction from a user equipment and send the data recovery instruction to a file drive module;

the VTL configuration module 43, configured to virtualize a storage medium to tapes, respond to the data backup instruction received by the I/O management module 45, and generate virtual tape configuration information corresponding to the backup data received by the I/O management module 45, where the virtual tape configuration information includes an offset position of a data block used for storing the backup data and a size of the data block in a virtual tape;

the file drive module 44, configured to respond to the data recovery instruction and acquire virtual tape configuration information corresponding to to-be-recovered backup data from the VTL configuration module; and the I/O management module 45, configured to receive the data backup instruction and the backup data; when performing data backup, write the backup data into the magnetic disk according to the virtual tape configuration information corresponding to the backup data; and when performing data recovery, read recovery data from the storage medium according to the virtual tape configuration information corresponding to the to-be-recovered backup data and send the recovery data to the NAS interface module.

The NAS interface module is further configured to return the recovery data to the user equipment.

The storage medium may be any storage medium, such as a magnetic disk, an optical disk, or a flash memory, and it is not limited in the VTL device in this embodiment. A magnetic disk is used as an example in the following.

The VTL device in this embodiment may provide data backup and data recovery functions. The following describes the VTL device in detail by using a data backup process and a data recovery process that are performed by the VTL device.

Specifically, during the data backup process, the VTL configuration module 43 virtualizes the magnetic disk to tapes, partitions storage space in the magnetic disk, where each storage space may be understood as a virtual tape with a certain length, and identifies each virtual tape, for example, names the virtual tapes. In addition, the VTL configuration module 43 generates three files for each virtual tape, that is, a metadata file (Metafile), an index file (Indxfile), and a data file (Datafile). Table 1 is a layout structure of the metadata file.

TABLE 1

| Medium Property | Tape Type | Capacity | Barcode | ... |
| (Medium Type) | (Media Type) | (Capacity) | (Barcode) | |

As shown in Table 1, the metadata file records property information of a virtual tape, such as medium property, tape type, capacity, and barcode. Each item of information in the metadata file is configured by the VTL configuration module when the virtual tape is formed.

Table 2 is a layout structure of the index file.

TABLE 2

| Flag (Flag) | Offset Position (Data Offset) | Size (Size) | ... |
|---|---|---|---|
| First data block | ... | ... | ... |
| ... | ... | ... | ... |

As shown in Table 2, the index file includes index items corresponding to each data block of a virtual tape and index content includes information, such as an offset position of a data block in the virtual tape, a size of the data block, and whether the data block is encrypted and compressed for storage. When the virtual tape is formed, the index items in the index file are empty. During data backup, content of each index item is added according to the backup data.

When performing data backup, the backup server packages file data that needs to be backed up and received from client A and client B to form a backup data packet and sends the backup data packet to the VTL interface module 41. After learning that the VTL interface module 41 receives the backup data packet from the backup server, the VTL configuration module 43 generates virtual tape configuration information corresponding to the backup data packet, that is, generates index items corresponding to the backup data packet in the index file. Generally, a backup data packet is stored as a data block in a virtual tape. A current virtual tape that has stored no backup data packet is used as an example. The backup data packet is stored in the first data block whose offset position is "0" and size is a size of the backup data packet, such as "3M".

Table 3 is a layout structure of the data file.

TABLE 3

| First data block | Second data block | Third data block | ... |
|---|---|---|---|

As shown in FIG. 3, the data file is partitioned in unit of data block. Generally, a data block corresponds to a backup data packet. When a virtual tape is formed, the data file is empty and is used for storing the backup data packet during data backup.

For example, when the backup data packet with a size of 3M is received, and after the VTL configuration module 43 generates virtual tape configuration information corresponding to the backup data packet, the I/O management module writes the backup data packet into storage space corresponding to the first data block of the virtual tape in the magnetic disk according to the virtual tape configuration information by invoking a standard write interface of a file system.

Till now, a data backup operation is complete.

Figure 5:
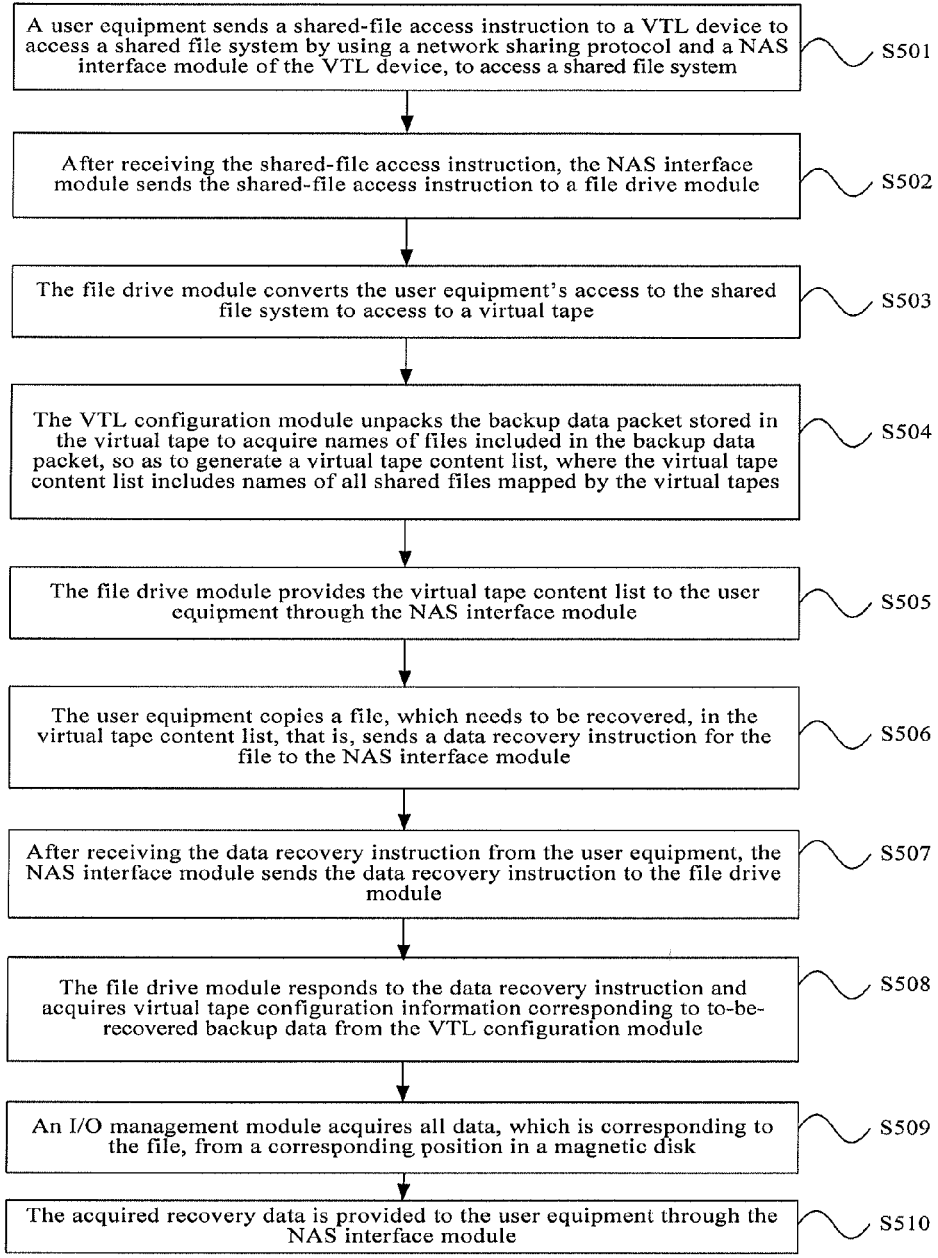
FIG. 5 is a flowchart schematic of data recovery performed by a VTL configuration module according to an embodiment of the present invention.

FIG. 5 is a flowchart schematic of data recovery performed by a VTL configuration module according to an embodiment of the present invention. As shown in FIG. 5, the following steps are included:

Step S501. A user equipment sends a shared-file access instruction to a VTL device to access a shared file system by using a network sharing protocol and a NAS interface module of the VTL device, to access a shared file system.

Step S502. After receiving the shared-file access instruction, the NAS interface module sends the shared-file access instruction to a file drive module.

Step S503. The file drive module converts the user equipment's access to the shared file system to access to a virtual tape, that is, searches for a backup data packet stored in the virtual tape accessed by the user equipment according to virtual tape configuration information stored in the VTL configuration module.

Step S504. The VTL configuration module unpacks the backup data packet stored in the virtual tape to acquire names of files included in the backup data packet, so as to generate a virtual tape content list, where the virtual tape content list includes names of all shared files mapped by the virtual tapes.

Step S505. The file drive module provides the virtual tape content list to the user equipment through the NAS interface module.

Step S506. The user equipment copies a file, which needs to be recovered, in the virtual tape content list, that is, sends a data recovery instruction for the file to the NAS interface module.

Step S507. After receiving the data recovery instruction from the user equipment, the NAS interface module sends the data recovery instruction to the file drive module.

Step S508. The file drive module responds to the data recovery instruction and acquires virtual tape configuration information corresponding to to-be-recovered backup data from the VTL configuration module, so as to learn the data block in the virtual tape that stores file data that needs to be recovered and the storage position of the data block in the virtual tape.

Step S509. An I/O management module acquires all data, which is corresponding to the file, from a corresponding position in the magnetic disk by invoking a standard data read (read) interface provided by the file system.

Step S510. The acquired recovery data is provided to the user equipment through the NAS interface module.

Till now, a data recovery operation is complete.

According to the VTL device in this embodiment, when the VTL device connects to a magnetic disk used for storing or the VTL device is integrated into a server, because the VTL device provides both a VTL interface module connecting to a backup server and a NAS interface module that is capable of implementing file sharing with a client, data backup may be performed by using a VTL interface module and a VTL configuration module; and when receiving a data recovery instruction through the NAS interface module, a file drive module obtains a real storage position of data backed up in VTL mode in the magnetic disk by parsing from the VTL configuration module according to the data recovery instruction so as to read data required to be recovered by the client and provide the data to the client through a NAS interface. Therefore, data recovery on data that has been backed up may be implemented by using a NAS interface based on the VTL device. When data recovery is performed in shared NAS mode, a user does not need to operate backup software and the recovered data does not need to pass through the backup server and may directly reach the client by using a sharing protocol. This improves efficiency and convenience of data recovery, relieves pressure of the backup server, and further provides the guarantee of efficiency and reliability of data recovery.

Further, the VTL device in this embodiment further comprises:

a module for controlling a redundant array of independent disks RAID, configured to partition magnetic disks into RAID groups when the number of existing magnetic disks is more than or equal to 2.

According to the VTL device in this embodiment, a RAID technology is used to partition and protect magnetic disks, so that a fault tolerant mechanism is provided for data in magnetic disks that belong a same RAID group, that is, backup data may be stored in two or more magnetic disks that belong to a same RAID group. Therefore, when a magnetic disk is damaged, data may be recovered by using other magnetic disks in the RAID group according to a RAID check mechanism, thereby improving safety and reliability of data recovery.

Further, the VTL device in this embodiment further includes a management interface module used to manage a virtual tape library device.

Specifically, the management interface module is configured to provide a man-machine interaction interface, acquire the initialization settings of a VTL interface module, a NAS interface module, a VTL configuration module, a file drive module, and an input/output management module, and monitor the running statuses of the VTL interface module, the NAS interface module, the VTL configuration module, the file drive module, and the input/output management module.

Further, the VTL device in this embodiment further includes an operating system used to control running and suspending of the VTL interface module, the NAS interface module, the VTL configuration module, the file drive module, and the input/output management module, where the operating system is, for example, a bottom layer operating system of a server on which the VTL device in this embodiment is installed.

Figure 6:
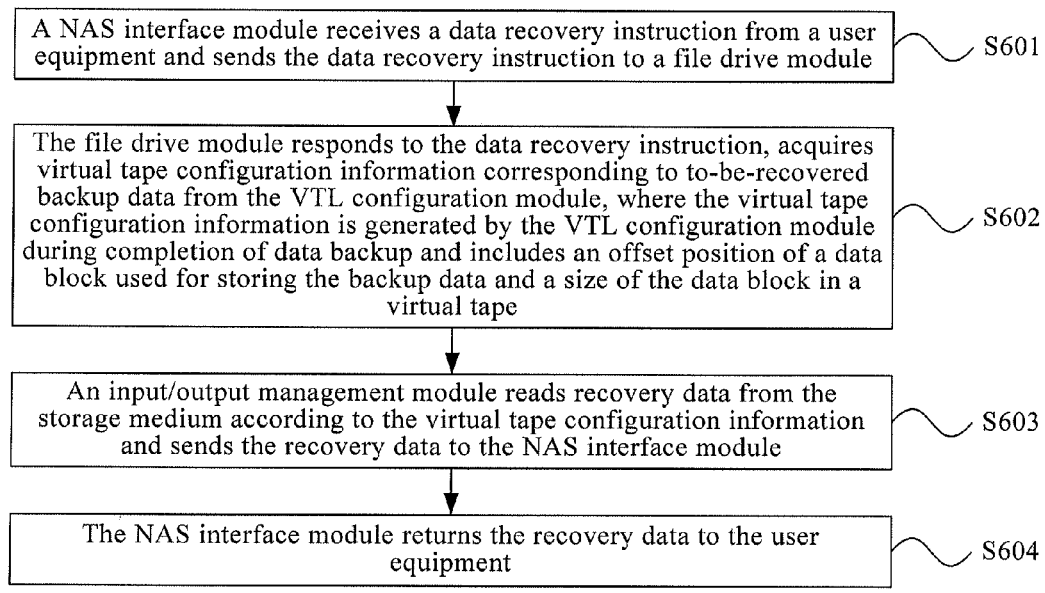
FIG. 6 is a flowchart schematic of a data recovery method according to an embodiment of the present invention.

FIG. 6 is a flowchart schematic of a data recovery method according to an embodiment of the present invention. As shown in FIG. 6, the data recovery method includes the following steps:

Step S601. A NAS interface module receives a data recovery instruction from a user equipment and sends the data recovery instruction to a file drive module.

Step S602. The file drive module responds to the data recovery instruction, acquires virtual tape configuration information corresponding to to-be-recovered backup data from the VTL configuration module, where the virtual tape configuration information is generated by the VTL configuration module during completion of data backup and includes an offset position of a data block used for storing the backup data and a size of the data block in a virtual tape.

Step S603. An input/output management module reads recovery data from the storage medium according to the virtual tape configuration information and sends the recovery data to the NAS interface module.

Step S604. The NAS interface module returns the recovery data to the user equipment.

The data recovery method in this embodiment is executed by the VTL device in the above embodiment. The detailed flow is the same as the flow shown in FIG. 5, and therefore no further details are provided herein.

According to the data recovery method in this embodiment, data recovery on data that has been backed up in the VTL device may be implemented by using a NAS interface. When data recovery is performed in shared NAS mode, a user does not need to operate backup software and the recovered data does not need to pass through a backup server and may directly reach a client by using a sharing protocol. This improves efficiency and convenience of data recovery, relieves pressure of the backup server, and further provides the guarantee of efficiency and reliability of data recovery.

Further, before the NAS interface module receives the data recovery instruction from the user equipment, the data recovery method in this embodiment includes:

receiving, by the NAS interface module, a shared-file access instruction and sending the shared-file access instruction to the file drive module; and acquiring, by the file drive module, names of files pre-stored in virtual tapes according to the virtual tape configuration information, generating a virtual tape content list, and sending the virtual tape content list to the user equipment through the NAS interface module, so that the user equipment initiates a data recovery instruction according to the virtual tape content list.

Further, before receiving, by the NAS interface module, the shared-file access instruction, the data recovery method in this embodiment further includes:

the NAS interface module is further configured to map sub-directories of a shared file system to the virtual tapes, so that the user equipment initiates the shared-file access instruction for requesting access to the virtual tapes; and accordingly, acquiring, by the file drive module, the names of files pre-stored in the virtual tapes according to the virtual tape configuration information, generating the virtual tape content list, and sending the virtual tape content list to the user equipment through the NAS interface module, specifically comprise:

acquiring, by the file drive module, backup data stored in the virtual tapes through the I/O management module, performing unpacking processing on the backup data to acquire files included in the backup data, and returning the files in catalogue manner to the user equipment through the NAS interface module, so that the user equipment initiates the data recovery instruction used for requesting recovering of the files.

Further, the data recovery method in this embodiment further includes: when a storage medium is a magnetic disk and the number of existing magnetic disks is greater than or equal to 2, a RAID control module partitions the magnetic disks into RAID groups.

According to the data recovery method in this embodiment, a RAID technology is used to partition and protect magnetic disks, so that a fault tolerant mechanism is provided for data in magnetic disks that belong to a same RAID group, that is, backup data may be stored in two or more magnetic disks that belong to a same RAID group. Therefore, when a magnetic disk is damaged, data may be recovered by using other magnetic disks in the RAID group according to a RAID check mechanism, thereby improving safety and reliability of data recovery.

Finally, it should be noted that the foregoing embodiment is merely intended for describing the technical solutions of the present invention other than limiting the present invention. Although the present invention is described in detail with reference to the foregoing embodiments, a person of ordinary skill in the art should understand that modifications may still be made to the technical solutions described in the foregoing embodiments, or equivalent replacements may still be made to some technical features thereof, without departing from the idea and scope of the technical solutions of the embodiments of the present invention.

What is claimed is:

1. A virtual tape library device, connected to a storage medium and a user equipment, comprising:

a virtual tape library VTL interface unit, configured to receive a data backup instruction and backup data from a backup server and send the data backup instruction and the backup data to a VTL configuration unit and an input/output management unit;

a network attached storage NAS interface unit, configured to receive a data recovery instruction from the user equipment and send the data recovery instruction to a file drive unit;

the VTL configuration unit, configured to virtualize the storage medium to tapes, and after receiving the backup instruction, generate virtual tape configuration information corresponding to the backup data, where the virtual tape configuration information comprises an offset position of a data block used for storing the backup data and a size of the data block in a virtual tape;

the file drive unit, configured to acquire virtual tape configuration information corresponding to to-be-recovered backup data from the VTL configuration unit after receiving the data recovery instruction; and the input/output management unit, configured to, after receiving the backup instruction, acquire the virtual tape configuration information corresponding to the backup data from the VTL configuration unit and write the backup data to the storage medium according to the virtual tape configuration information; and further configured to, when executing data recovery, read recovery data from the storage medium according to the virtual tape configuration information corresponding to the to-be-recovered backup data and send the recovery data to the NAS interface unit, wherein: the NAS interface unit is further configured to return the recovery data to the user equipment; and receive a shared-file access instruction and send the shared-file access instruction to the file drive unit; and the file drive unit is further configured to after receiving the shared-file access instruction, acquire names of files pre-stored in virtual tapes according to the virtual tape configuration information, generate a virtual tape content list, and send the virtual tape content list to the user equipment through the NAS interface unit, so that the user equipment initiates the data recovery instruction according to the virtual tape content list.

2. The virtual tape library device according to claim 1, wherein:

the NAS interface unit is further configured to, before receiving the shared-file access instruction, map sub-directories of a shared file system to the virtual tapes, so that the user equipment initiates the shared-file access instruction for requesting access to the virtual tapes; and the file drive unit is further configured to acquire backup data stored in the virtual tapes through the input output management unit, perform unpacking processing on the backup data to acquire files comprised in the backup data, and return the files in catalogue manner to the user equipment through the NAS interface unit, so that the user equipment initiates the data recovery instruction used for requesting recovering of the files.

3. The virtual tape library device according to claim 1, further comprising:

a unit for controlling a redundant array of independent disks RAID, configured to, when a storage medium is a magnetic disk and the number of existing magnetic disks is greater than or equal to 2, partition magnetic disks into a RAID group.

4. The virtual tape library device according to claim 1, further comprising:

a management interface unit, configured to provide a man-machine interaction interface, acquire initialization settings of the VTL interface unit, the NAS interface unit, the VTL configuration unit, the file drive unit, and the input/output management unit, and monitor running statuses of the VTL interface unit, the NAS interface unit, the VTL configuration unit, the file drive unit, and the input/output management unit.

5. The virtual tape library device according to claim 1, further comprising:

an operating system, configured to control running and suspending of the VTL interface unit, the NAS interface unit, the VTL configuration unit, the file drive unit, and the input/output management unit.

6. The virtual tape library device according to claim 1, wherein the VTL configuration unit is further configured to partition the storage medium to at least two virtual tapes, generate, for each of the virtual tapes, a metadata file used for storing attribute information of the virtual tape, an index file used for storing the virtual tape configuration information of the backup data, and a data file used for storing the backup data in data block mode, set the attribute information of the virtual tape in the metadata file, respond to the data backup instruction, and generate the virtual tape configuration information corresponding to the backup data in the index file.

7. A data recovery method implemented by the virtual tape library device which connected to a storage medium and a user equipment, comprising:

receiving, by the NAS interface unit, a shared-file access instruction and sending the shared-file access instruction to the file drive unit;

acquiring, by the file drive unit, names of files pre-stored in virtual tapes according to the virtual tape configuration information, generating a virtual tape content list, and sending the virtual tape content list to the user equipment through the NAS interface unit, so that the user equipment initiates the data recovery instruction according to the virtual tape content list;

after sending the virtual tape content list to the user equipment through the NAS interface unit, receiving, by a NAS interface unit, a data recovery instruction from a user equipment, and sending the data recovery instruction to a file drive unit;

responding, by a file drive unit to the data recovery instruction, acquiring virtual tape configuration information corresponding to to-be-recovered backup data from a VTL configuration unit, wherein the virtual tape configuration information is generated by the VTL configuration unit during completion of data backup and comprises an offset position of a data block used for storing the backup data and a size of the data block in a virtual tape;

reading, by an input/output management unit, recovery data from a storage medium according to the virtual tape configuration information, and sending the recovery data to the NAS interface unit; and returning, by the NAS interface unit, the recovery data to the user equipment.

8. The data recovery method according to claim 7, before the receiving, by the NAS interface unit, the shared-file access instruction, further comprising that:

the NAS interface unit is further configured to map sub-directories of a shared file system to the virtual tapes, so that the user equipment initiates the shared-file access instruction for requesting access to the virtual tapes; and accordingly, the acquiring, by the file drive unit the names of files pre-stored in the virtual tapes according to the virtual tape configuration information, generating the virtual tape content list, and sending the virtual tape content list to the user equipment through the NAS interface unit, specifically comprise:

acquiring, by the file drive unit backup data stored in the virtual tapes through an I/O management unit, performing unpacking processing on the backup data to acquire files comprised in the backup data, and returning the files in catalogue manner to the user equipment through the NAS interface unit, so that the user equipment initiates the data recovery instruction used for requesting recovering of the files.

* * * * *